(12) United States Patent
Panchaksharaiah et al.

(10) Patent No.: US 11,381,878 B2
(45) Date of Patent: *Jul. 5, 2022

(54) SYSTEM AND METHODS FOR RECOMMENDING A MEDIA ASSET RELATING TO A CHARACTER UNKNOWN TO A USER

(71) Applicant: Rovi Guides, Inc., San Jose, CA (US)

(72) Inventors: Vishwas Sharadanagar Panchaksharaiah, Karnataka (IN); Ashwini Dharwa, Ratlam (IN); Gaurav Gupta, Rajasthan (IN); Harsha Neerakani, Karnataka (IN)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/076,297

(22) Filed: Oct. 21, 2020

(65) Prior Publication Data

US 2021/0152888 A1  May 20, 2021

Related U.S. Application Data

(63) Continuation of application No. 16/385,158, filed on Apr. 16, 2019, now Pat. No. 10,848,828, which is a (Continued)

(51) Int. Cl.
| | |
|---|---|
| *H04N 7/16* | (2011.01) |
| *H04N 21/466* | (2011.01) |
| *H04N 21/234* | (2011.01) |
| *H04N 21/845* | (2011.01) |
| *H04N 21/8547* | (2011.01) |

(Continued)

(52) U.S. Cl.
CPC ....... *H04N 21/4668* (2013.01); *G06F 16/735* (2019.01); *H04N 21/23418* (2013.01); *H04N 21/4532* (2013.01); *H04N 21/4667* (2013.01); *H04N 21/4821* (2013.01); *H04N 21/8133* (2013.01); *H04N 21/8456* (2013.01); *H04N 21/8547* (2013.01); *H04N 21/4316* (2013.01)

(58) Field of Classification Search
CPC ......... H04N 21/4668; H04N 21/23418; H04N 21/4532; H04N 21/4667; H04N 21/4821; H04N 21/8133; H04N 21/8456; H04N 21/8547; H04N 21/4316; G06F 16/735
See application file for complete search history.

(56) References Cited

U.S. PATENT DOCUMENTS 8,204,897 B1 * 6/2012 Djabarov ............ G06F 16/9535
  707/767
9,473,819 B1 * 10/2016 Bostick .............. H04N 21/4788
(Continued)

*Primary Examiner* — Annan Q Shang
(74) *Attorney, Agent, or Firm* — Haley Guiliano LLP

(57) ABSTRACT

Systems and methods for recommending a media asset relating to a character unknown to a user are provided herein. The systems and methods may receive a first media asset viewed by a user, determine a first character in the first media asset, and include the first character in the character viewing profile for the user. Further, the systems and methods may receive a second media asset, including the first character, determine that a second character appears in the second media asset, and determine that the second character is not in the character viewing profile. The systems and methods may recommend a third media asset to the user for the second character.

18 Claims, 9 Drawing Sheets

Related U.S. Application Data continuation of application No. 15/449,179, filed on Mar. 3, 2017, now Pat. No. 10,313,756.

(51) Int. Cl.
*H04N 21/81* (2011.01)
*H04N 21/45* (2011.01)
*G06F 16/735* (2019.01)
*H04N 21/482* (2011.01)
*H04N 21/431* (2011.01)

(56) References Cited

U.S. PATENT DOCUMENTS

| | | | |
|---|---|---|---|
| 2014/0282745 A1* | 9/2014 | Chipman | H04N 21/47214 725/61 |
| 2015/0189347 A1* | 7/2015 | Oztaskent | G06F 16/903 725/32 |
| 2015/0326688 A1* | 11/2015 | Aarnio | G06F 16/683 707/748 |
| 2016/0182954 A1* | 6/2016 | Nguyen | H04N 21/44204 725/10 |
| 2016/0274744 A1* | 9/2016 | Neumann | H04N 21/252 |

* cited by examiner

SYSTEM AND METHODS FOR RECOMMENDING A MEDIA ASSET RELATING TO A CHARACTER UNKNOWN TO A USER

CROSS-REFERENCE TO RELATED APPLICATIONS

This patent application is a continuation of U.S. patent application Ser. No. 16/385,158, filed Apr. 16, 2019, which is a continuation of U.S. patent application Ser. No. 15/449,179, filed Mar. 3, 2017, now U.S. Pat. No. 10,313,756, the disclosures of which are hereby incorporated by reference herein in their entireties.

BACKGROUND

Often a user attempts to view a movie without being familiar with several of the characters that are featured in the movie. The user might be following a first series and characters from a second series may be featured in the first series. In cases in which the user is not familiar with the second series, the user may lack critical knowledge about the new characters' backgrounds and storylines. As a result, the user is not able to completely understand and enjoy the new movie from the first series that has characters from the second series, unfamiliar to the user. For example, the user may be following the Captain America series. The user has already watched "Captain America: The First Avenger" and is planning to go to the theater to watch "Captain America: Civil War." However, "Captain America: Civil War" features Hawkeye, with whom the user is not familiar, because he is not following the Hawkeye movie series. As a result, the user is not able to completely understand and enjoy "Captain America: Civil War" because he is unfamiliar with Hawkeye's background and storyline.

SUMMARY

Systems and methods are provided herein for recommending a media asset relating to a character unknown to a user. As used herein, the term "character" is defined to mean a fictional person that appears in a threshold number of segments of a media asset. As used herein, the term "threshold number" is defined to mean a number or a percentage set by the media guidance application, by the user, or another suitable means. The number or the percentage may be the same or different for all media assets. In some embodiments, the number or the percentage is a function of the type of the media asset. For example, a user may be following the Captain America series. The new Captain America movie, "Captain America: Civil War," features Captain America and Hawkeye, besides other characters. The user is familiar with Captain America because he follows the Captain America series. However, the user is not familiar with Hawkeye. As a result the user may not understand Hawkeye's abilities and scenes involving Hawkeye. The systems and methods disclosed herein may recommend that the user view a media asset related to Hawkeye before the user views "Captain America: Civil War." An example of such media asset would be "Next Avengers: Heroes of Tomorrow," which features Hawkeye as a character.

In some aspects, the media guidance application may detect that the user consumed a first media asset. For example, the first media asset might be the first Captain America movie, "Captain America: The First Avenger." The media guidance application may then analyze the first media asset segment by segment and determine a first character that appears in a threshold number of segments. For example, the media guidance application may identify that Captain America is present in most of the segments, and thus the media guidance application may establish Captain America as the first character of the first media asset. Further, the media guidance application may store the information related to the first character into a character viewing profile. For example, the media guidance application may store Captain America, the character, into a character viewing profile. The media guidance application may store important information about Captain America in the character viewing profile. After some time the media guidance application may detect a second media asset, related to a new media asset, that will soon be available. For example, the media guidance application may detect that a new Captain America movie will be available soon, "Captain America: Civil War."

Being aware of the fact that the user is following the Captain America series, the media guidance application may analyze media assets related to the new movie, such as trailers, reviews, synopses and articles to try to determine what characters appear in "Captain America: Civil War." The media guidance application may analyze the media assets, related to the new movie, to determine a second character that appears in a threshold number of segments. For example, the media guidance application may analyze a trailer of "Captain America: Civil War" and determine that Hawkeye is a character because it often appears throughout the trailer. Further, the media guidance application may conclude that the second character is not in the character viewing profile and recommend to the user a third media asset that contains the second character. For example, the media guidance application may determine that the user is not familiar with Hawkeye and recommend that the user view "Next Avengers: Heroes of Tomorrow," which features Hawkeye. The media guidance application may also recommend comic books or other suitable forms of media assets to the user.

In some embodiments, the media guidance application may determine if the user has viewed a substantial portion of the first media asset before concluding that the user is familiar with the first character. The media guidance application may use a sensor to determine if the user was paying enough attention while consuming the first media asset. For example, the media guidance application may use an eye-tracking sensor to determine if the user was paying attention while viewing "Captain America: The First Avenger." In another example, the media guidance application may determine the user has viewed a substantial portion based on the amount of the first media asset that has been played back.

In some embodiments, the media guidance application may receive data associated with the first media asset. The media guidance application may split this data into equal portions to make them easier to analyze. The media guidance application may split the data into a plurality of segments with each segment containing an equal amount of data. For example, the media guidance application may split the video data associated with "Captain America: The First Avenger" into a hundred segments to make them easier to analyze.

In some embodiments, the media guidance application may receive video characteristics of the first character. Further, the media guidance application may use those characteristics to determine if the first character is featured in the first media asset. The media guidance application may determine if the first character is present in each segment of the first media asset. If the media guidance application determines that the first character is present in a large number of segments, the media guidance application may determine that the first character is a featured character in the first media asset. For example, the media guidance application may receive video characteristics of Captain America and use those characteristics to determine if Captain America is a featured character in "Captain America: The First Avenger." The media guidance application may split the video file that corresponds to the Captain America movie into a plurality of segments. Further, the media guidance application may use the video characteristics, such as facial recognition patterns, to determine if Captain America appears in a large number of segments. If the media guidance application concludes that Captain America does appear in a large number of segments, the media guidance application may conclude that Captain America is a featured character in "Captain America: The First Avenger."

In some embodiments, the media guidance application may receive audio characteristics of the first character. Further, the media guidance application may use those characteristics to determine if the first character is an important character in the first media asset. The media guidance application may determine if the first character is present in each segment of the first media asset. If the media guidance application determines that the first character is present in a big number of segments, the media guidance application may determine that the first character is an important character in the first media asset. For example, the media guidance application may receive audio characteristics of Captain America and use those characteristics to determine if Captain America is an important character in "Captain America: The First Avenger." The media guidance application may split the audio file that corresponds to the Captain America movie into a plurality of segments; further the media guidance application may use the audio characteristics, such as voice patterns, to determine if Captain America appears in a big number of segments. If the media guidance application concludes that Captain America does appear in a big number of segments, the media guidance application may conclude that Captain America is an important character in "Captain America: The First Avenger."

In some embodiments, the media guidance application may receive the name of the first character. Further, the media guidance application may use the name to determine if the first character is an important character in the first media asset. The media guidance application may determine if the first character is present in each segment of the first media asset. If the media guidance application determines that the first character is present in a big number of segments, the media guidance application may determine that the first character is an important character in the first media asset. For example, the media guidance application may receive the name of Captain America and use the name to determine if Captain America is an important character in "Captain America: The First Avenger." The media guidance application may split the subtitle data corresponding to the Captain America movie into a plurality of words; further, the media guidance application may use the name to determine if Captain America's name is any of the words. If the media guidance application concludes that Captain America's name is a big number of words, the media guidance application may conclude that Captain America is an important character in "Captain America: The First Avenger."

In some embodiments, the media guidance application may store the time at which the user viewed the media asset containing the first character into the first character's profile in the character viewing profile. For example, if the user saw "Captain America: The First Avenger" on Jan. 23, 2017, the media guidance application may store this date in the profile of the Captain America character in the character viewing profile. The media guidance application may further use this information to determine if the user needs to refresh his knowledge of the first character. For example, the media guidance application may, in January 2018, check the profile character of Captain America and may conclude that the user needs to refresh his knowledge of Captain America.

In some embodiments, the media guidance application may check how recently a third media asset, featuring the second character, was consumed by the user. If the third media asset was consumed some time ago, the media guidance application may recommend that the user consume the third media asset one more time. For example, the media guidance application may determine that the user is familiar with Hawkeye but that the user viewed "Next Avengers: Heroes of Tomorrow" a year ago. In this case, the media guidance application may recommend that the user rewatch "Next Avengers: Heroes of Tomorrow" to refresh his knowledge of Hawkeye.

In some embodiments, the media guidance application may check how recently the first media asset, featuring the first character, was consumed by the user. If the first media asset was consumed a long time ago, the media guidance application may recommend that the user consume the first media asset one more time. For example, the media guidance application may determine that the user is familiar with Captain America but that the user viewed "Captain America: The First Avenger" a year ago. In this case, the media guidance application may recommend that the user rewatch "Captain America: The First Avenger" to refresh his knowledge of Captain America.

In some embodiments, the media guidance application may consult the character viewing profile of a second user. The media guidance application may receive, upon request, access to the character viewing profile of the second user. Alternatively, the media guidance application may send a query to the second character viewing profile about the second character specifically. The media guidance application may determine that the second user is familiar with the second character, and thus the media guidance application may recommend that the first user ask the second user about the second character. For example, the media guidance application may request permission to access the character viewing profile from the user's friend. Alternatively, the media guidance application may query the user's friend's character viewing profile about Captain America specifically. The media guidance application may determine that the user has a friend who is familiar with Hawkeye. The media guidance application may recommend that the user ask his friend about Hawkeye before viewing "Captain America: Civil War."

In some aspects, a media guidance application may receive a first media asset viewed by a user. Further, the media guidance application may determine a first character in the first media asset. Even further, the media guidance application may include the first character in the character viewing profile for the user. Further, the media guidance application may receive a second media asset including the first character. Even further, the media guidance application may determine that a second character appears in the second media asset. Further, the media guidance application may determine that the second character is not in the character viewing profile. Even further, the media guidance application may recommend a third media asset to the user for the second character.

In some aspects, a media guidance application may receive a first media asset viewed by the user. The first media asset may, for example, be "Captain America: The First Avenger," which is the first Captain America movie. Further, the media guidance application may split the first media asset into a first plurality of segments. The first plurality of segments may, for example, be a plurality of video, audio, and/or subtitles segments. Further, the media guidance application may determine that a first character appears in a threshold number of the first plurality of segments. The first character may, for example, be Captain America. Further, the media guidance application may determine whether the first character has a corresponding first data structure in a character viewing profile for the user. The media guidance application may, in response to determining that the first character does not have the corresponding first data structure in the character viewing profile, insert the first data structure in the character viewing profile. Further, the media guidance application may, in response to determining that the first character has the corresponding first data structure in the character viewing profile, update the first data structure in the character viewing profile. Further, the media guidance application may receive a second media asset, including the first character, to be viewed by the user. The second media asset may, for example, be a trailer of "Captain America: Civil War." Further, the media guidance application may split the second media asset into a second plurality of segments. Further, the media guidance application may determine that a second character appears in the threshold number of the second plurality of segments. The second character may, for example, be Hawkeye. Further, the media guidance application may determine whether the second character has a corresponding second data structure in the character viewing profile. Even further, the media guidance application may, in response to determining that the second character does not have the corresponding second data structure in the character viewing profile, recommend a third media asset to the user for the second character. The third media may, for example, be "Next Avengers: Heroes of Tomorrow".

In some embodiments, the media guidance application may receive a sensor input. Further, the media guidance application may determine that the user consumed the threshold number of the first plurality of segments, based on the sensor input. For example, while watching "Captain America: The First Avenger" the media guidance application may receive input from an eye-tracking sensor. Further, the media guidance application may determine that the user's eyes were focused on his phone throughout most of the movie, and thus the media guidance application may conclude that the user is not familiar with Captain America. Even further, the media guidance application may, in response to determining that the user consumed the threshold number of the first plurality of segments, receive the first media asset viewed by the user.

In some embodiments, the media guidance application may receive, during splitting, a data structure associated with the first media asset. As used herein, the term "data structure" is defined to include data characterizing a media asset. Examples of such data included in the data structure may be listings of frames, listings of sentences, listing of audio sequences, and the like. Further, the media guidance application may split the data structure into a third plurality of segments, wherein each segment may contain an equal portion of the data structure. As used herein, "splitting the data structure" is defined to mean dividing the data included in the data structure into smaller segments. For example, the data structure may include twenty frames, and splitting the data structure may comprise creating two segments, the first segment comprising frames one through ten and the second segment comprising frames eleven through twenty. For example, the media guidance application may split "Captain America: The First Avenger" into a hundred segments with each segment containing an equal amount of data. Thus, the media guidance application may analyze each of the segments easily.

In some embodiments, the media guidance application may receive, during receiving the indication that the first character appears in the threshold number of the first plurality of segments, video characteristics of the first character. Further, the media guidance application may receive a segment from the first plurality of segments. Even further, the media guidance application may receive a set of frames relating to the segments. Further, the media guidance application may extract a frame from the set of frames. Even further, the media guidance application may determine whether the first character is in the frame, based on the video characteristics of the first character. Further, the media guidance application may, in response to determining that the first character is in the frame, increase a counter associated with the first character. Even further, the media guidance application may determine whether there are segments remaining to be analyzed. Further, the media guidance application may, in response to determining that there are no segments remaining to be analyzed, determine that the counter is greater than the threshold number. Even further, the media guidance application may, in response to determining that the counter is greater than the threshold number, determine that the first character appears in a threshold number of the first plurality of segments. For example, the media guidance application may receive the facial characteristics of Captain America. Further, the media guidance application may split the video data associated with "Captain America: The First Avenger" into multiple segments and search for Captain America, in each of those segments, using facial recognition techniques.

In some embodiments, the media guidance application may receive, during receiving the indication that the first character appears in the threshold number of the first plurality of segments, audio characteristics of the first character. Further, the media guidance application may receive a segment from the first plurality of segments. Even further, the media guidance application may receive a set of words relating to the segments. Further, the media guidance application may extract a word from the set of words. Even further, the media guidance application may determine whether the first character said the word, based on the audio characteristics of the first character. Further, the media guidance application may, in response to determining that the first character said the word, increase a counter associated with the first character. Even further, the media guidance application may determine whether there are segments remaining to be analyzed. Further, the media guidance application may, in response to determining that there are no segments remaining to be analyzed, determine that the counter is greater than the threshold number. Even further, the media guidance application may, in response to determining that the counter is greater than the threshold number, determine that the first character appears in a threshold number of the first plurality of segments. For example, the media guidance application may receive the voice samples belonging to Captain America. Further, the media guidance application may split the audio data associated with "Captain America: The First Avenger" into multiple segments and search for Captain America, in each of those segments, using voice recognition techniques.

In some embodiments, the media guidance application may receive, during receiving the indication that the first character appears in the threshold number of the first plurality of segments, a name of the first character. Further, the media guidance application may receive a segment from the first plurality of segments. Even further, the media guidance application may receive a set of words relating to the segments. Further, the media guidance application may extract a word from the set of words. Even further, the media guidance application may determine whether the name of the first character is the word. Further, the media guidance application may, in response to determining that the first character said the word, increase a counter associated with the first character. Even further, the media guidance application may determine whether there are segments remaining to be analyzed. Further, the media guidance application may, in response to determining that there are no segments remaining to be analyzed, determine that the counter is greater than the threshold number. Even further, the media guidance application may, in response to determining that the counter is greater than the threshold number, determine that the first character appears in a threshold number of the first plurality of segments. For example, the media guidance application may receive the name of Captain America. Further, the media guidance application may split the subtitle data associated with "Captain America: The First Avenger" into words and search for Captain America's name in each of those segments.

In some embodiments, the media guidance application may store, during creating and/or splitting the first data structure, a time stamp in the first data structure corresponding to when the user viewed the first media asset. For example, when the user first watches a movie containing Captain America, e.g., "Captain America: The First Avenger," the media guidance application may store the date and time at which the user viewed the movie in the first data structure associated with Captain America.

In some embodiments, the media guidance application may receive, in response to determining that the second character has the corresponding second data structure in the character viewing profile, a threshold period relating to a user retention of the second character. Further, the media guidance application may determine a current period between the time stamp and a current time. Further, the media guidance application may determine that the current period exceeds the threshold period. Even further, the media guidance application may, in response to determining that the current period exceeds the threshold period, recommend the third media asset to the user for the second character. For example, the media guidance application may determine that the user is familiar with Hawkeye but that the user viewed "Next Avengers: Heroes of Tomorrow" 10 years ago; in this case the media guidance application may recommend that the user re-watch "Next Avengers: Heroes of Tomorrow" to refresh his knowledge of Hawkeye.

In some embodiments, the media guidance application may receive an expiration period associated with the first character. Further, the media guidance application may determine a current period between the time stamp and a current time. Further, the media guidance application may determine that the current period exceeds the expiration period. Even further, the media guidance application may, in response to determining that the current period exceeds the expiration period, recommend the first media asset to the user for the first character. For example, the media guidance application may determine that the user is familiar with Captain America but that the user viewed "Captain America: The First Avenger" 10 year ago, in this case the media guidance application may recommend that the user re-watches "Captain America: The First Avenger" to refresh his knowledge of Captain America.

In some embodiments, the media guidance application may receive a second character viewing profile of a second user. The second user may, for example, be a friend of the user. Further, the media guidance application, may determine that the second character has the corresponding second data structure in the second character viewing profile. Even further, the media guidance application may, in response to determining that the second character has the corresponding second data structure in the second character viewing profile, recommend to the user to refer to the second user. For example, the media guidance application may determine that the user has a friend who is familiar with Hawkeye. The media guidance application may recommend that the user ask his friend about Hawkeye, before viewing "Captain America: Civil War."

Often a user attempts to consume a media asset without being familiar with several of the characters that are featured in the media asset. For example, the user might be following a first series and characters from a second series are featured in the first series. In cases in which the user is not familiar with the second series, the user might lack critical knowledge about the new character's background and storyline. As a result, the user is not able to completely understand and enjoy the new media asset from the first series that has characters from the second series, unfamiliar to the user.

The conventional approach to this problem is for the user to consume the second media asset, related to the unknown character, after the user consumes the first media asset. The systems and methods disclosed herein provide a solution that allows the user to become familiar with the unknown character before the user consumes the first media asset, thus enabling the user to fully understand and enjoy the consumption of the first media asset. This solution is achieved by a media guidance application that may receive a first media asset viewed by a user, determine a first character in the first media asset, include the first character in the character viewing profile for the user, receive a second media asset including the first character, determine that a second character appears in the second media asset, determine that the second character is not in the character viewing profile, and recommend a third media asset to the user for the second character. The proposed solution is different from the conventional approach because the proposed solution allows the user to be automatically notified and become familiar with the unknown character before the user consumes the first media asset, while the conventional approach at most leads to the user becoming familiar with the unknown character after the user has already consumed the first media asset.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for recommending a media asset relating to a character unknown to a user. As used herein, the term "character" is defined to mean a fictional person that appears in a threshold number of segments of a media asset. As used herein, the term "threshold number" is defined to mean a number or a percentage set by the media guidance application or by the user. The number or the percentage can be the same or different for all the media assets; the number or the percentage can be a function of the type of the media asset. For example, a user may be following the Captain America series. The new Captain America movie, "Captain America: Civil War," features Captain America and Hawkeye, besides other characters. The user is familiar with Captain America because he follows the Captain America series. However, the user is not familiar with Hawkeye. As a result, the user may not understand Hawkeye's abilities and scenes involving Hawkeye. The systems and methods disclosed herein may recommend that the user view a media asset related to Hawkeye before the user views "Captain America: Civil War." An example of such media asset would be "Next Avengers: Heroes of Tomorrow," which features Hawkeye as a character.

Figure 1:
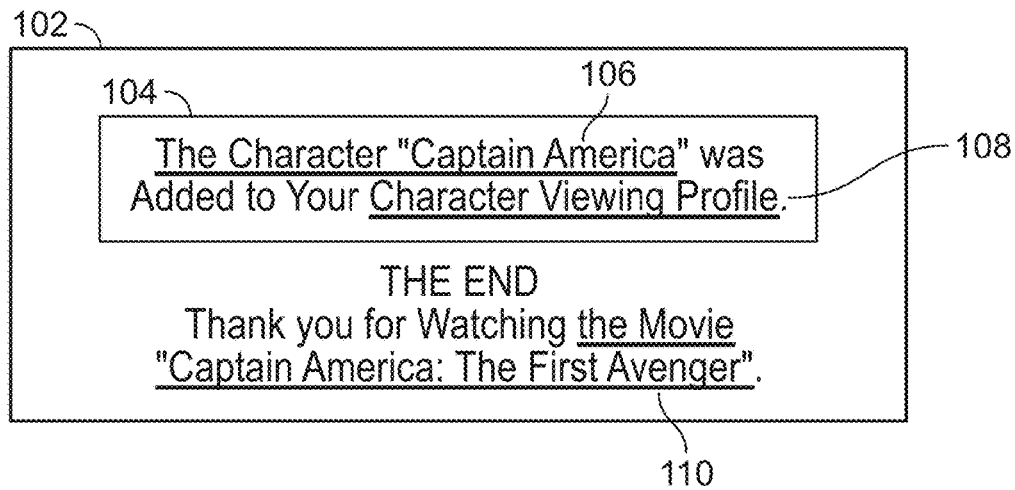
FIG. 1 shows an illustrative example of an interactive media guidance application implemented on a user device for including a first character in the character viewing profile in accordance with some embodiments of the disclosure.

FIG. 1 shows an illustrative example of an interactive media guidance application implemented on a user device for including a first character in the character viewing profile in accordance with some embodiments of the disclosure. As depicted, FIG. 1 includes an alert 102, a sub-alert 104, a first character 106, a character viewing profile 108, and a first media asset 110. The media guidance application may present alert 102 and sub-alert 104 on display 612 when the user finishes consuming first media asset 110. Alert 102 and sub-alert 104 may notify the user that first character 106 was added to character viewing profile 108. The control circuitry 604 may identify first character 106 and add first character 106 to character viewing profile 108. The processing circuitry may identify first character 106 and add first character 106 to character viewing profile 108. Storage 608 may contain character viewing profile 108.

Figure 2:
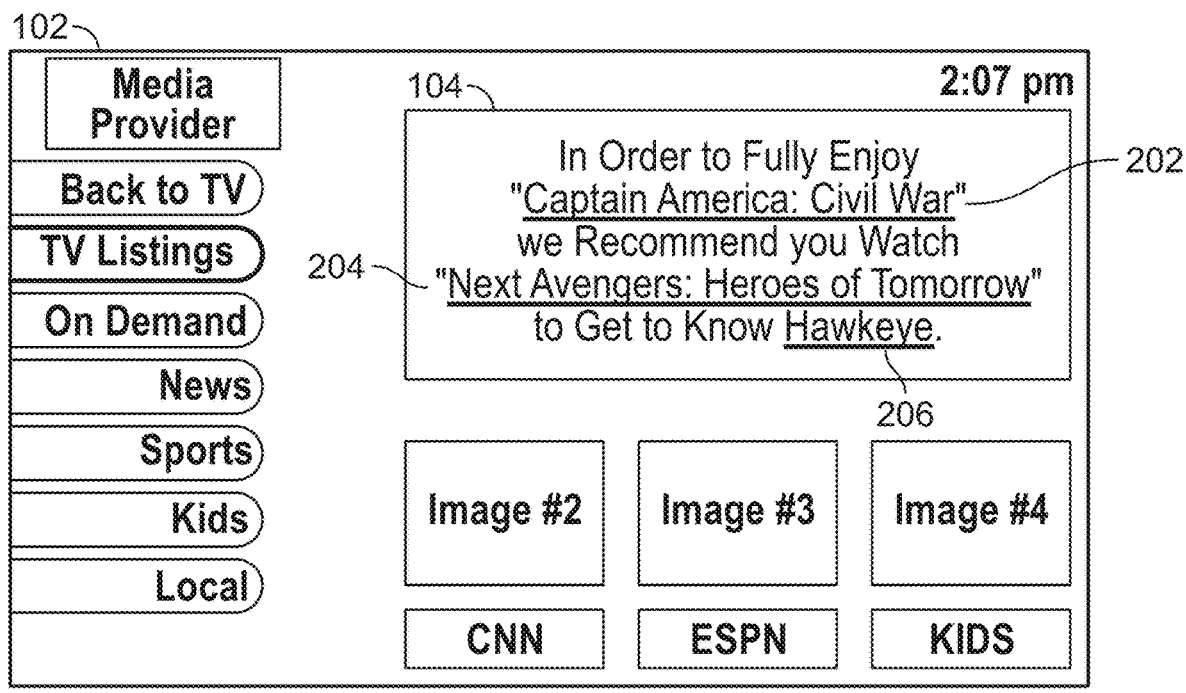
FIG. 2 shows an illustrative example of an interactive media guidance application implemented on a user device for recommending a media asset relating to a character unknown to the user in accordance with some embodiments of the disclosure.

FIG. 2 shows an illustrative example of an interactive media guidance application implemented on a user device for recommending a media asset relating to a character unknown to the user in accordance with some embodiments of the disclosure. As depicted, FIG. 2 includes alert 102, sub-alert 104, a second media asset 202, a third media asset 204, and a second character 206. The media guidance application may present alert 102 and sub-alert 104 on display 612. Alert 102 and sub-alert 104 may recommend to the user third media asset 204 for second character 206, which is featured in second media asset 202. The control circuitry 604 may identify second character 206, second media asset 202, and third media asset 204. The processing circuitry 606 may identify second character 206, second media asset 202, and third media asset 204.

Figure 3:
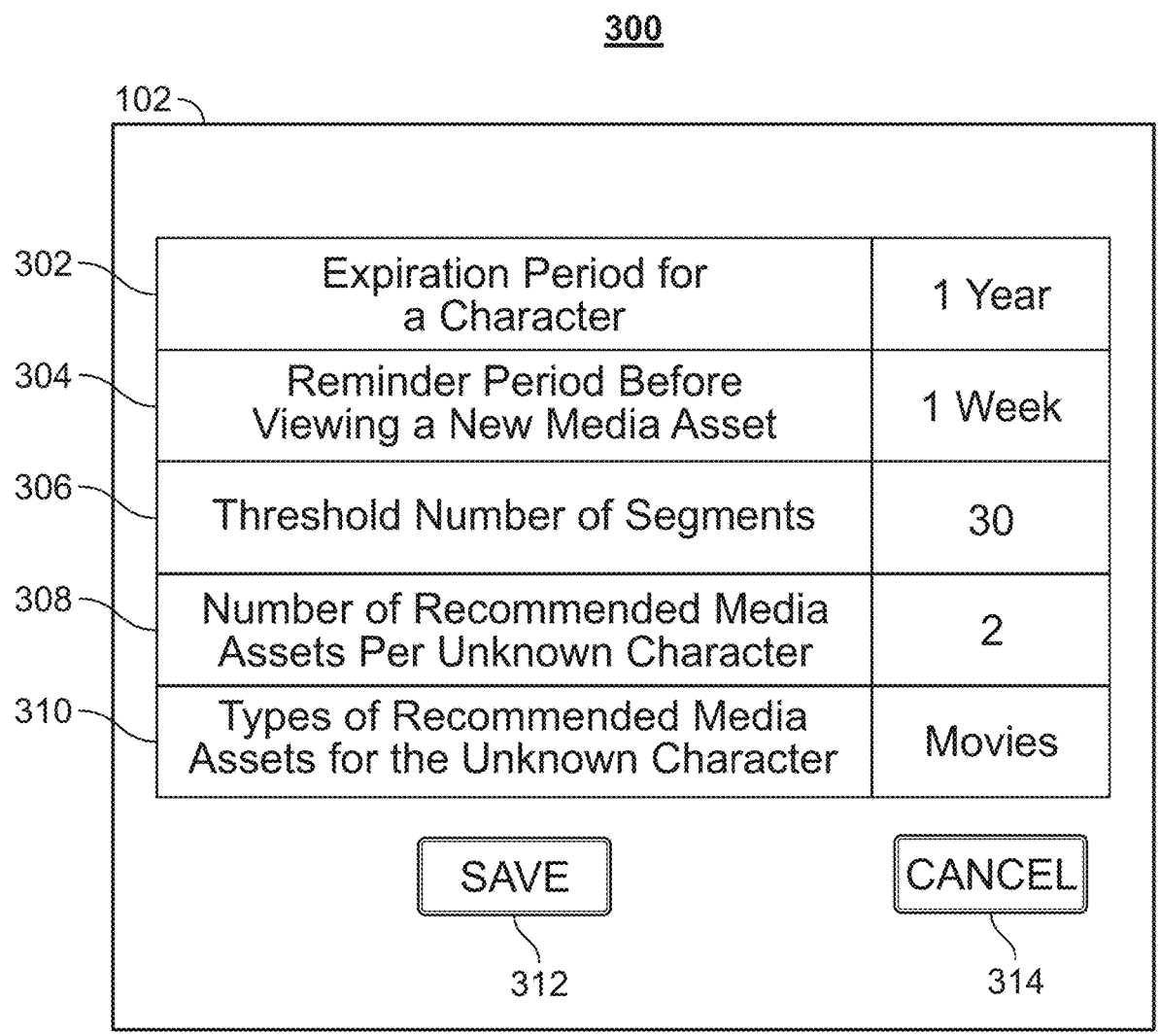
FIG. 3 shows yet another illustrative example of an interactive media guidance application implemented on a user device for selecting media guidance application options in accordance with some embodiments of the disclosure.

FIG. 3 shows yet another illustrative example of an interactive media guidance application implemented on a user device for selecting media guidance application options in accordance with some embodiments of the disclosure. As depicted, FIG. 3 includes alert 102, preference options 302-310, and options 312 and 314. The media guidance application may present alert 102 on display 612. Alert 102 may allow the user to select the expiration period for a character—preference option 302. Preference option 302 may be specified in terms of days, weeks, months, years or any other conventional period of time. Preference option 302 may be set by the user or by the media guidance application. Preference option 302 may be set for a specific character, for all characters, or as a function of the type of the character and/or media asset.

Alert 102 may allow the user to select the reminder period before viewing a new media asset—preference option 304. Preference option 304 may be specified in terms of days, weeks, months, years or any other conventional period of time. Preference option 304 may be set by the user or by the media guidance application. Preference option 304 may be set for a specific character, for all characters, or as a function of the type of the character and/or media asset.

Alert 102 may allow the user to select the threshold number of segments—preference option 306. Preference option 306 may be specified as a number or a percent. Preference option 306 may be set by the user or by the media guidance application. Preference option 306 may be set for a specific character, for all characters, or as a function of the type of the character and/or media asset.

Alert 102 may allow the user to select the number of recommended media assets per unknown character—preference option 308. Preference option 308 may be set by the user or by the media guidance application. Preference option 308 may be set for a specific character, for all characters, or as a function of the type of the character and/or media asset.

Alert 102 may allow the user to select the types of recommended media assets for the unknown character—preference option 310. Preference option 310 may be a movie, a comic book, a trailer, a cartoon or any other media asset. Preference option 310 may be set by the user or by the media guidance application. Preference option 310 may be set for a specific character, for all characters, or as a function of the type of the character and/or media asset.

Alert 102 may allow the user to select option 312 or option 314. Selecting option 312 may allow the user to save the selected preference options 302-310. Control circuitry 604 may store the preference options 302-310 in storage 608. Processing circuitry 604 may store the preference options 302-310 in storage 608. Selecting option 314 may allow the user to cancel the selected preference options 302-310.

In some aspects, the media guidance application may detect that the user consumed a first media asset 110. For example, the first media asset 110 might be the first Captain America movie, "Captain America: The First Avenger." The media guidance application may then analyze the first media asset 110 segment by segment and determine a first character 106 that appears in a threshold number of segments. For example, the media guidance application may identify that Captain America is present in most of the segments, and thus the media guidance application may establish Captain America as the first character 106 of the first media asset 110. Further, the media guidance application may store the information related to the first character 106 into a character viewing profile 108. For example, the media guidance application may store Captain America, the character, into a character viewing profile 108. The media guidance application may store important information about Captain America in the character viewing profile 108. After some time the media guidance application may detect a second media asset 202, related to a new media asset, which will soon be available. For example, the media guidance application may detect that a new Captain America movie will be available soon—"Captain America: Civil War."

Being aware of the fact that the user is following the Captain America series, the media guidance application may analyze media assets related to the new movie, such as trailers, reviews, synopses and articles to try to determine what characters appear in "Captain America: Civil War." The media guidance application may split the second media asset 202, related to the new movie, to determine a second character 206 that appears in a threshold number of segments. For example, the media guidance application may analyze a trailer of "Captain America: Civil War" and determine that Hawkeye is a character because it often appears throughout the trailer. Further, the media guidance application may conclude that the second character 206 is not in the character viewing profile 108 and recommend a third media asset 204, which contains the second character 206, to the user. For example, the media guidance application may realize that the user is not familiar with Hawkeye and recommend that the user watch "Next Avengers: Heroes of Tomorrow," which features Hawkeye. The media guidance application may also recommend comic books or other forms of media assets to the user.

In some embodiments, the media guidance application may determine if the user has viewed enough of the first media asset 110 before concluding that the user is familiar with the first character 106. The media guidance application may use a sensor to determine if the user was paying enough attention while consuming the first media asset 110. For example, the media guidance application may use an eye-tracking sensor to determine if the user was paying attention while viewing "Captain America: The First Avenger."

In some embodiments, the media guidance application may receive data associated with the first media asset 110; the media guidance application may then split this data into equal portions, to make them easier to analyze. The media guidance application may split the data into a third plurality of segments with each segment containing an equal amount of data. For example, the media guidance application may split the video data associated with "Captain America: The First Avenger" into a hundred equal segments to make them easier to analyze.

In some embodiments, the media guidance application may receive video characteristics of the first character 106. Further, the media guidance application may use those characteristics to determine if the first character 106 is an important character in the first media asset 110. The media guidance application may determine if the first character 106 is present in each segment of the first media asset 110. If the media guidance application determines that the first character 106 is present in a big number of segments, the media guidance application may determine that the first character 106 is an important character in the first media asset 110. For example, the media guidance application may receive video characteristics of Captain America and use those characteristics to determine if Captain America is an important character in "Captain America: The First Avenger." The media guidance application may split the video file that corresponds to the Captain America movie, into a plurality of segments; further, the media guidance application may use the video characteristics, such as facial patterns, to determine if Captain America appears in a big number of segments. If the media guidance application concludes that Captain America does appear in a big number of segments, the media guidance application may conclude that Captain America is an important character in "Captain America: The First Avenger."

In some embodiments, the media guidance application may receive audio characteristics of the first character 106. Further, the media guidance application may use those characteristics to determine if the first character 106 is an important character in the first media asset 110. The media guidance application may determine if the first character 106 is present in each segment of the first media asset 110. If the media guidance application determines that the first character 106 is present in a big number of segments, the media guidance application may determine that the first character 106 is an important character in the first media asset 110. For example, the media guidance application may receive audio characteristics of Captain America and use those characteristics to determine if Captain America is an important character in "Captain America: The First Avenger." The media guidance application may split the audio file that corresponds to the Captain America movie into a plurality of segments; further, the media guidance application may use the audio characteristics, such as voice patterns, to determine if Captain America appears in a big number of segments. If the media guidance application concludes that Captain America does appear in a big number of segments, the media guidance application may conclude that Captain America is an important character in "Captain America: The First Avenger."

In some embodiments, the media guidance application may receive the name of the first character 106. Further, the media guidance application may use the name to determine if the first character 106 is an important character in the first media asset 110. The media guidance application may determine if the first character 106 is present in each segment of the first media asset 110. If the media guidance application determines that the first character 106 is present in a big number of segments, the media guidance application may determine that the first character 106 is an important character in the first media asset 110. For example, the media guidance application may receive the name of Captain America and use the name to determine if Captain America is an important character in "Captain America: The First Avenger." The media guidance application may split the subtitle data corresponding to the Captain America movie, into a plurality of words; further, the media guidance application may use the name to determine if Captain America's name is any of the words. If the media guidance application concludes that Captain America's name is a big number of words, the media guidance application may conclude that Captain America is an important character in "Captain America: The First Avenger."

In some embodiments, the media guidance application may store the time at which the user viewed the media asset containing the first character 106 into the first character's 106 profile in the character viewing profile 108. For example, if the user saw "Captain America: The First Avenger" on Jan. 23, 2017, the media guidance application may store this date in the profile of the Captain America character in the character viewing profile 108. The media guidance application may further use this information to determine if the user needs to refresh his knowledge of the first character 106. For example, the media guidance application may, in January 2018, check the profile character of Captain America and may conclude that the user needs to refresh his knowledge of Captain America.

In some embodiments, the media guidance application may check how recently a third media asset 204, featuring the second character 206, was consumed by the user. If the third media asset 204 was consumed some time ago, the media guidance application may recommend that the user consume the third media asset 204 one more time. For example, the media guidance application may determine that the user is familiar with Hawkeye but that the user viewed "Next Avengers: Heroes of Tomorrow" a year ago; in this case, the media guidance application may recommend that the user re-watches "Next Avengers: Heroes of Tomorrow" to refresh his knowledge of Hawkeye.

In some embodiments, the media guidance application may check how recently was the first media asset 110, featuring the first character 106, consumed by the user. If the first media asset 110 was consumed a long time ago, the media guidance application may recommend that the user consumes the first media asset 110 one more time. For example, the media guidance application may determine that the user is familiar with Captain America but that the user viewed "Captain America: The First Avenger" a year ago, in this case the media guidance application may recommend that the user re-watch "Captain America: The First Avenger" to refresh his knowledge of Captain America.

In some embodiments, the media guidance application may consult the character viewing profile 108 of a second user. The media guidance application may receive, upon requesting, access to the character viewing profile 108 of the second user. Alternatively, the media guidance application may send a query to the second user's character viewing profile 108 about the second character 206 specifically. The media guidance application may determine that the second user is familiar with the second character 206, and thus the media guidance application may recommend that the first user asks the second user about the second character 206. For example, the media guidance application may request permission to access the character viewing profile 108 from the user's friend. Alternatively, the media guidance application may query the user's friend's character viewing profile 108 about Captain America specifically. The media guidance application may determine that the user has a friend who is familiar with Hawkeye. The media guidance application may recommend that the user ask his friend about Hawkeye, before viewing "Captain America: Civil War."

In some aspects, a media guidance application may receive a first media asset 110 viewed by a user. Further, the media guidance application may determine a first character 106 in the first media asset 110. Even further, the media guidance application may include the first character 106 in the character viewing profile 108 for the user. Further, the media guidance application may receive a second media asset 202 including the first character 106. Even further, the media guidance application may determine that a second character 206 appears in the second media asset 202. Further, the media guidance application may determine that the second character 206 is not in the character viewing profile 108. Even further, the media guidance application may recommend a third media asset 204 to the user for the second character 206.

In some aspects, a media guidance application may receive a first media asset 110 viewed by the user. The first media asset 110 may, for example, be "Captain America: The First Avenger," which is the first Captain America movie. Further, the media guidance application may split the first media asset 110 into a first plurality of segments. The first plurality of segments may, for example, be a plurality of video, audio, and/or subtitles segments. Further, the media guidance application may determine that a first character 106 appears in a threshold number of the first plurality of segments. The first character 106 may, for example, be Captain America. Further, the media guidance application may determine whether the first character 106 has a corresponding first data structure in a character viewing profile 108 for the user. The media guidance application may, in response to determining that the first character 106 does not have the corresponding first data structure in the character viewing profile 108, insert the first data structure in the character viewing profile 108. Further, the media guidance application may, in response to determining that the first character 106 has the corresponding first data structure in the character viewing profile 108, update the first data structure in the character viewing profile 108. Further, the media guidance application may receive a second media asset 202, including the first character 106, to be viewed by the user. The second media asset 202 may, for example, be a trailer of "Captain America: Civil War." Further, the media guidance application may split the second media asset 202 into a second plurality of segments. Further, the media guidance application may determine that a second character 206 appears in the threshold number of the second plurality of segments. The second character 206 may, for example, be Hawkeye. Further, the media guidance application may determine whether the second character 206 has a corresponding second data structure in the character viewing profile 108. Even further, the media guidance application may, in response to determining that the second character 206 does not have the corresponding second data structure in the character viewing profile 108, recommend a third media asset 204 to the user for the second character 206. The third media may, for example, be "Next Avengers: Heroes of Tomorrow."

In some embodiments, the media guidance application may receive a sensor input. Further, the media guidance application may determine that the user consumed the threshold number of the first plurality of segments, based on the sensor input. For example, while watching "Captain America: The First Avenger," the media guidance application may receive input from an eye-tracking sensor. Further, the media guidance application may determine that the user's eyes were focused on his phone throughout most of the movie and thus the media guidance application may conclude that the user is not familiar with Captain America. Even further, the media guidance application may, in response to determining that the user consumed the threshold number of the first plurality of segments, receive the first media asset viewed by the user.

In some embodiments, the media guidance application may receive, during splitting, a data structure associated with the first media asset 110. Further, the media guidance application may split the data structure into a third plurality of segments, wherein each segment may contain an equal portion of the data structure. For example, the media guidance application may split "Captain America: The First Avenger" into a hundred segments with each segment containing an equal amount of data. Thus, the media guidance application may analyze each of the segments easily.

In some embodiments, the media guidance application may receive, during receiving the indication that the first character 106 appears in the threshold number of the first plurality of segments, video characteristics of the first character 106. Further, the media guidance application may receive a segment from the first plurality of segments. Even further, the media guidance application may receive a set of frames relating to the segments. Further, the media guidance application may extract a frame from the set of frames. Even further, the media guidance application may determine whether the first character 106 is in the frame, based on the video characteristics of the first character 106. Further, the media guidance application may, in response to determining that the first character 106 is in the frame, increase a counter associated with the first character 106. Even further, the media guidance application may determine whether there are segments remaining to be analyzed. Further, the media guidance application may, in response to determining that there are no segments remaining to be analyzed, determine that the counter is greater than the threshold number. Even further, the media guidance application may, in response to determining that the counter is greater than the threshold number, determine that the first character 106 appears in a threshold number of the first plurality of segments. For example, the media guidance application may receive the facial characteristics of Captain America. Further, the media guidance application may split the video data associated with "Captain America: The First Avenger" into multiple segments and search for Captain America, in each of those segments, using facial recognition techniques.

In some embodiments, the media guidance application may receive, during receiving the indication that the first character 106 appears in the threshold number of the first plurality of segments, audio characteristics of the first character 106. Further, the media guidance application may receive a segment from the first plurality of segments. Even further, the media guidance application may receive a set of words relating to the segments. Further, the media guidance application may extract a word from the set of words. Even further, the media guidance application may determine whether the first character 106 said the word, based on the audio characteristics of the first character 106. Further, the media guidance application may, in response to determining that the first character 106 said the word, increase a counter associated with the first character 106. Even further, the media guidance application may determine whether there are segments remaining to be analyzed. Further, the media guidance application may, in response to determining that there are no segments remaining to be analyzed, determine that the counter is greater than the threshold number. Even further, the media guidance application may, in response to determining that the counter is greater than the threshold number, determine that the first character 106 appears in a threshold number of the first plurality of segments. For example, the media guidance application may receive the voice samples belonging to Captain America. Further, the media guidance application may split the audio data associated with "Captain America: The First Avenger" into multiple segments and search for Captain America, in each of those segments, using voice recognition techniques.

In some embodiments, the media guidance application may receive, during receiving the indication that the first character 106 appears in the threshold number of the first plurality of segments, a name of the first character 106. Further, the media guidance application may receive a segment from the first plurality of segments. Even further, the media guidance application may receive a set of words relating to the segments. Further, the media guidance application may extract a word from the set of words. Even further, the media guidance application may determine whether the name of the first character 106 is the word. Further, the media guidance application may, in response to determining that the first character 106 said the word, increase a counter associated with the first character 106. Even further, the media guidance application may determine whether there are segments remaining to be analyzed. Further, the media guidance application may, in response to determining that there are no segments remaining to be analyzed, determine that the counter is greater than the threshold number. Even further, the media guidance application may, in response to determining that the counter is greater than the threshold number, determine that the first character 106 appears in a threshold number of the first plurality of segments. For example, the media guidance application may receive the name of Captain America. Further, the media guidance application may split the subtitle data associated with "Captain America: The First Avenger" into words and search for Captain America's name in each of those segments.

In some embodiments, the media guidance application may store, during creating and/or splitting the first data structure, a time stamp in the first data structure corresponding to when the user viewed the first media asset 110. For example, when the user first watches a movie containing Captain America, e.g., "Captain America: The First Avenger," the media guidance application may store the date and time at which the user viewed the movie in the first data structure associated with Captain America.

In some embodiments, the media guidance application may receive, in response to determining that the second character 206 has the corresponding second data structure in the character viewing profile 108, a threshold period relating to a user retention of the second character 206. Further, the media guidance application may determine a current period between the time stamp and a current time. Further, the media guidance application may determine that the current period exceeds the threshold period. Even further, the media guidance application may, in response to determining that the current period exceeds the threshold period, recommend the third media asset 204 to the user for the second character 206. For example, the media guidance application may determine that the user is familiar with Hawkeye but that the user viewed "Next Avengers: Heroes of Tomorrow" 10 years ago; in this case, the media guidance application may recommend that the user re-watch "Next Avengers: Heroes of Tomorrow" to refresh his knowledge of Hawkeye.

In some embodiments, the media guidance application may receive an expiration period associated with the first character 106. Further, the media guidance application may determine a current period between the time stamp and a current time. Further, the media guidance application may determine that the current period exceeds the expiration period. Even further, the media guidance application may, in response to determining that the current period exceeds the expiration period, recommend the first media asset 110 to the user for the first character 106. For example, the media guidance application may determine that the user is familiar with Captain America but that the user viewed "Captain America: The First Avenger" 10 years ago; in this case; the media guidance application may recommend that the user re-watch "Captain America: The First Avenger" to refresh his knowledge of Captain America.

In some embodiments, the media guidance application may receive a second character viewing profile 108 of a second user. The second user may, for example, be a friend of the user. Further, the media guidance application may determine that the second character 206 has the corresponding second data structure in the second character viewing profile 108. Even further, the media guidance application may, in response to determining that the second character 206 has the corresponding second data structure in the second character viewing profile 108, recommend to the user to refer to the second user. For example, the media guidance application may determine that the user has a friend who is familiar with Hawkeye. The media guidance application may recommend that the user ask his friend about Hawkeye, before viewing "Captain America: Civil War."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
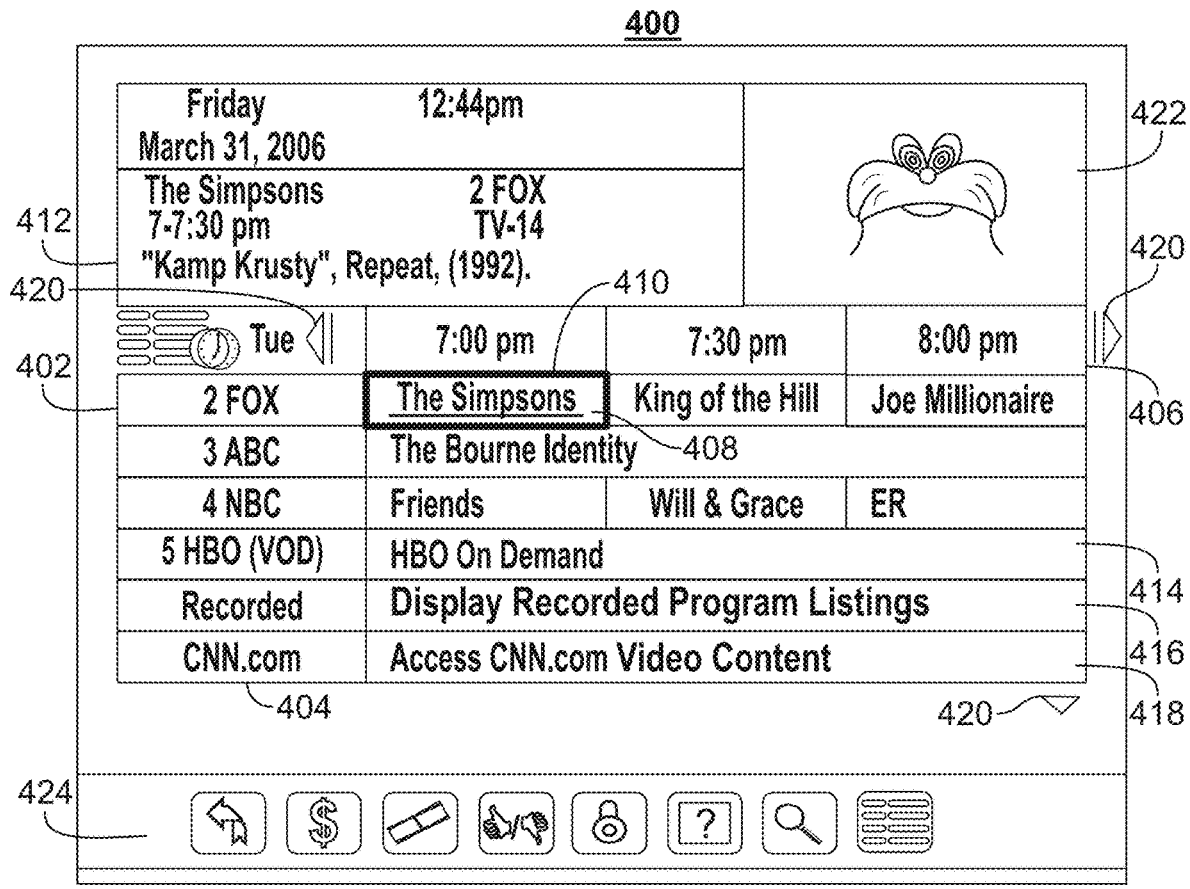
FIG. 4 shows an illustrative embodiment of a display screen that may be used to provide media guidance application listings and other media guidance information, in accordance with some embodiments of the disclosure.
Figure 5:
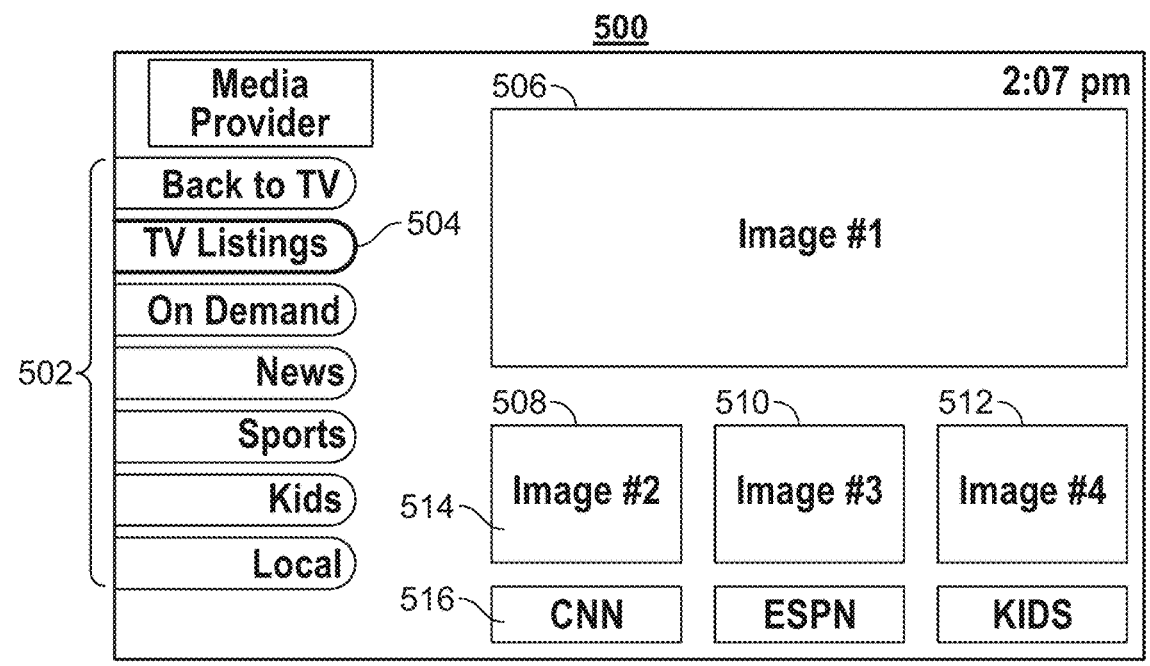
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
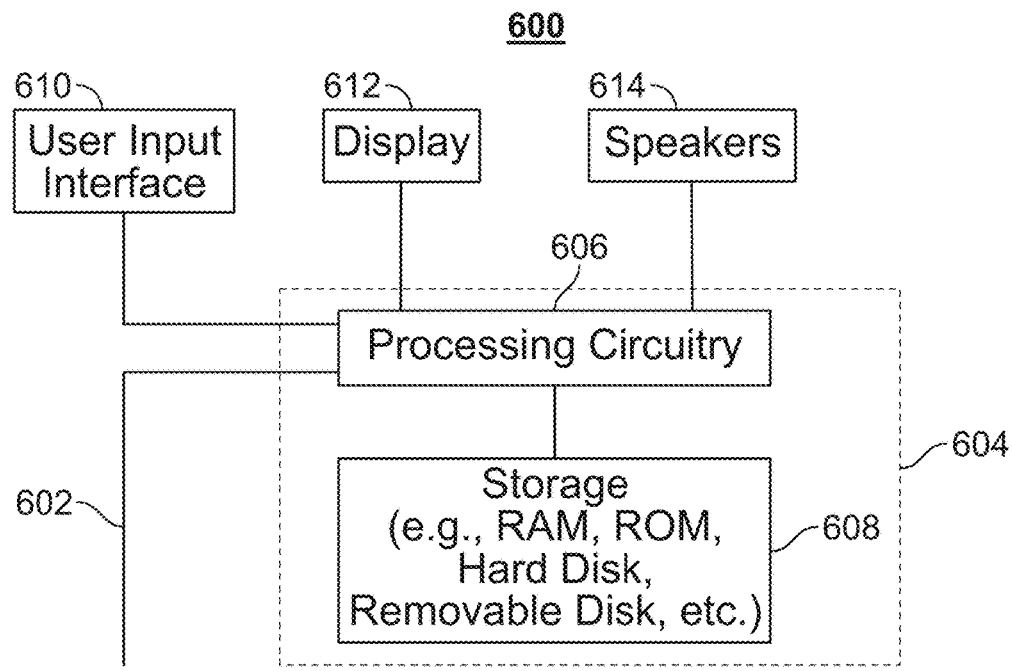
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
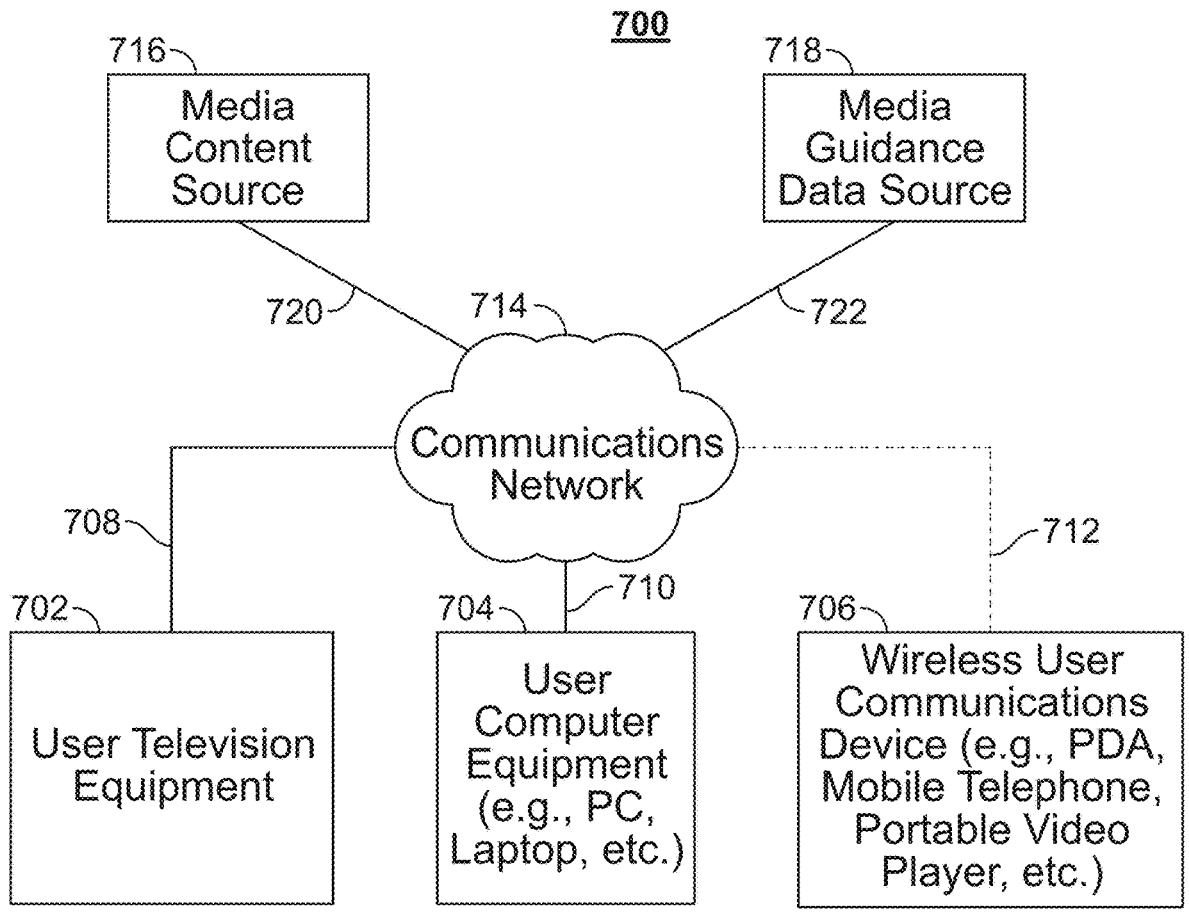
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser, In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

Figure 8:
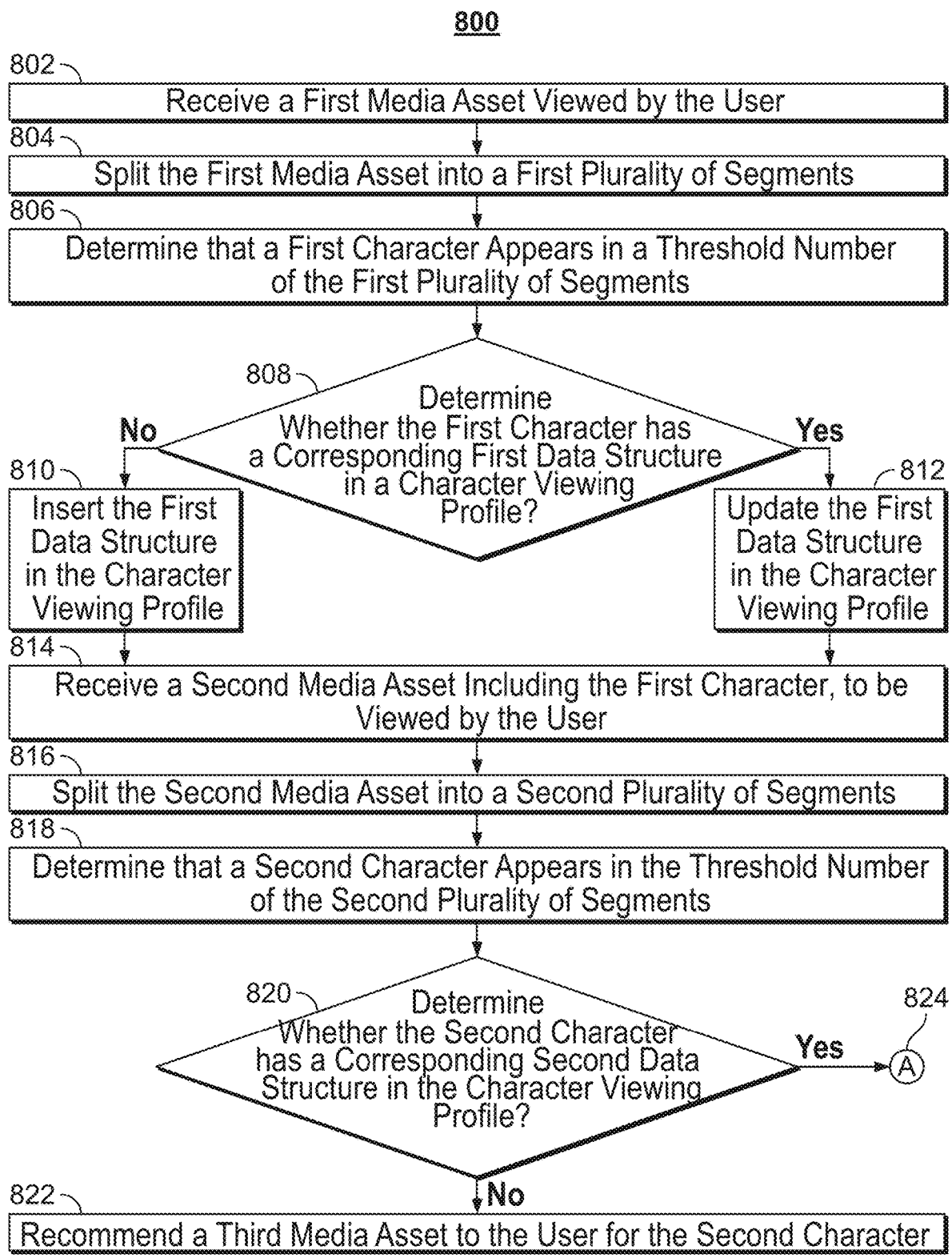
FIG. 8 depicts an illustrative flowchart of a process for recommending a third media asset relating to a second character, unknown to a user, in accordance with some embodiments of the disclosure.

FIG. 8 depicts an illustrative flowchart of a process for recommending a third media asset 204 relating to a second character 206, unknown to a user, in accordance with some embodiments of the disclosure. Process 800 may be executed by control circuitry 604 (e.g., in a manner instructed to control circuitry 604 by the media guidance application). Control circuitry 604 may be part of a remote server separated from the user by communication network 714.

Process 800 begins at 802, when control circuitry 404 receives a first media asset 110 viewed by a user. User input interface 610 can be used to receive the first media asset 110 viewed by the user. In some embodiments, the media guidance application may receive a sensor input. Further, the media guidance application may determine that the user consumed the threshold number of the first plurality of segments, based on the sensor input. For example, while watching "Captain America: The First Avenger," the media guidance application may receive input from an eye-tracking sensor. Further, the media guidance application may determine that user's eyes were focused on his phone throughout most of the movie, and thus the media guidance application may conclude that the user is not familiar with Captain America. Even further, the media guidance application may, in response to determining that the user consumed the threshold number of the first plurality of segments, receive the first media asset viewed by the user.

At 804, control circuitry 404 splits the first media asset 110 into a first plurality of segments. In some embodiments, the media guidance application may receive, during splitting, a data structure associated with the first media asset 110. Further, the media guidance application may split the data structure into a third plurality of segments, wherein each segment may contain an equal portion of the data structure. For example, the media guidance application may split "Captain America: The First Avenger" into a hundred segments with each segment containing an equal amount of data. Thus, the media guidance application may analyze each of the segments easily.

At 806, control circuitry 404 determines that a first character 106 appears in a threshold number of the first plurality of segments. Ways of determining that the first character appears in the threshold number of the first plurality of segments have been described below in respect to FIG. 10-12.

At 808, control circuitry 404 determines whether the first character 106 has a corresponding first data structure in a character viewing profile 108 for the user.

If control circuitry 404 determines that the first character 106 does not have the corresponding first data structure in the character viewing profile 108 for the user, process 800 continues to 810. At 810, control circuitry 404 inserts the first data structure in the character viewing profile 108. In some embodiments, the media guidance application may store, during inserting the first data structure, a time stamp in the first data structure corresponding to when the user viewed the first media asset 110. For example, when the user first watches a movie containing Captain America, e.g. "Captain America: The First Avenger," the media guidance application may store the date and time at which the user viewed the movie in the first data structure associated with Captain America. In some embodiments, the media guidance application may receive an expiration period associated with the first character 106. Further, the media guidance application may determine a current period between the time stamp and a current time. Further, the media guidance application may determine that the current period exceeds the expiration period. Even further, the media guidance application may, in response to determining that the current period exceeds the expiration period, recommend the first media asset 110 to the user for the first character 106. For example, the media guidance application may determine that the user is familiar with Captain America but that the user viewed "Captain America: The First Avenger" 10 years ago; in this case; the media guidance application may recommend that the user re-watch "Captain America: The First Avenger" to refresh his knowledge of Captain America.

If control circuitry 404 determines that the first character 106 has the corresponding first data structure in the character viewing profile 108 for the user, process 800 continues to 812. At 812, control circuitry 404 updates the first data structure in the character viewing profile 108. In some embodiments, the media guidance application may store, during updating the first data structure, a time stamp in the first data structure corresponding to when the user viewed the first media asset 110. For example, when the user first watches a movie containing Captain America, e.g. "Captain America: The First Avenger," the media guidance application may store the date and time at which the user viewed the movie in the first data structure associated with Captain America. In some embodiments, the media guidance application may receive an expiration period associated with the first character 106. Further, the media guidance application may determine a current period between the time stamp and a current time. Further, the media guidance application may determine that the current period exceeds the expiration period. Even further, the media guidance application may, in response to determining that the current period exceeds the expiration period, recommend the first media asset 110 to the user for the first character 106. For example, the media guidance application may determine that the user is familiar with Captain America but that the user viewed "Captain America: The First Avenger" 10 years ago; in this case, the media guidance application may recommend that the user re-watch "Captain America: The First Avenger" to refresh his knowledge of Captain America.

At 814, control circuitry 404 receives a second media asset 202, including the first character 106, to be viewed by the user. User input interface 610 can be used to receive the second media asset 202, including the first character 106, to be viewed by the user.

At 816, control circuitry 404 splits the second media asset 202 into a second plurality of segments.

At 818, control circuitry 404 determines that a second character 206 appears in the threshold number of the second plurality of segments.

At 820, control circuitry 404 determines whether the second character 206 has a corresponding second data structure in the character viewing profile 108.

If control circuitry 404 determines that the second character 206 does not have the corresponding second data structure in the character viewing profile 108, process 800 continues to 822. At 822, control circuitry 404 recommends a third media asset 204 to the user for the second character 206. Display 612 can be used to recommend the third media asset 204 to the user for the second character 206. Speakers 614 can be used to recommend a third media asset 204 to the user for the second character 206.

At 824, process 800 optionally continues to step 902 of process 900. In some embodiments, the media guidance application may receive, in response to determining that the second character 206 has the corresponding second data structure in the character viewing profile 108, a threshold period relating to a user retention of the second character 206. Further, the media guidance application may determine a current period between the time stamp and a current time. Further, the media guidance application may determine that the current period exceeds the threshold period. Even further, the media guidance application may, in response to determining that the current period exceeds the threshold period, recommend the third media asset 204 to the user for the second character 206. For example, the media guidance application may determine that the user is familiar with Hawkeye but that the user viewed "Next Avengers: Heroes of Tomorrow" 10 years ago; in this case, the media guidance application may recommend that the user re-watch "Next Avengers: Heroes of Tomorrow" to refresh his knowledge of Hawkeye.

Figure 9:
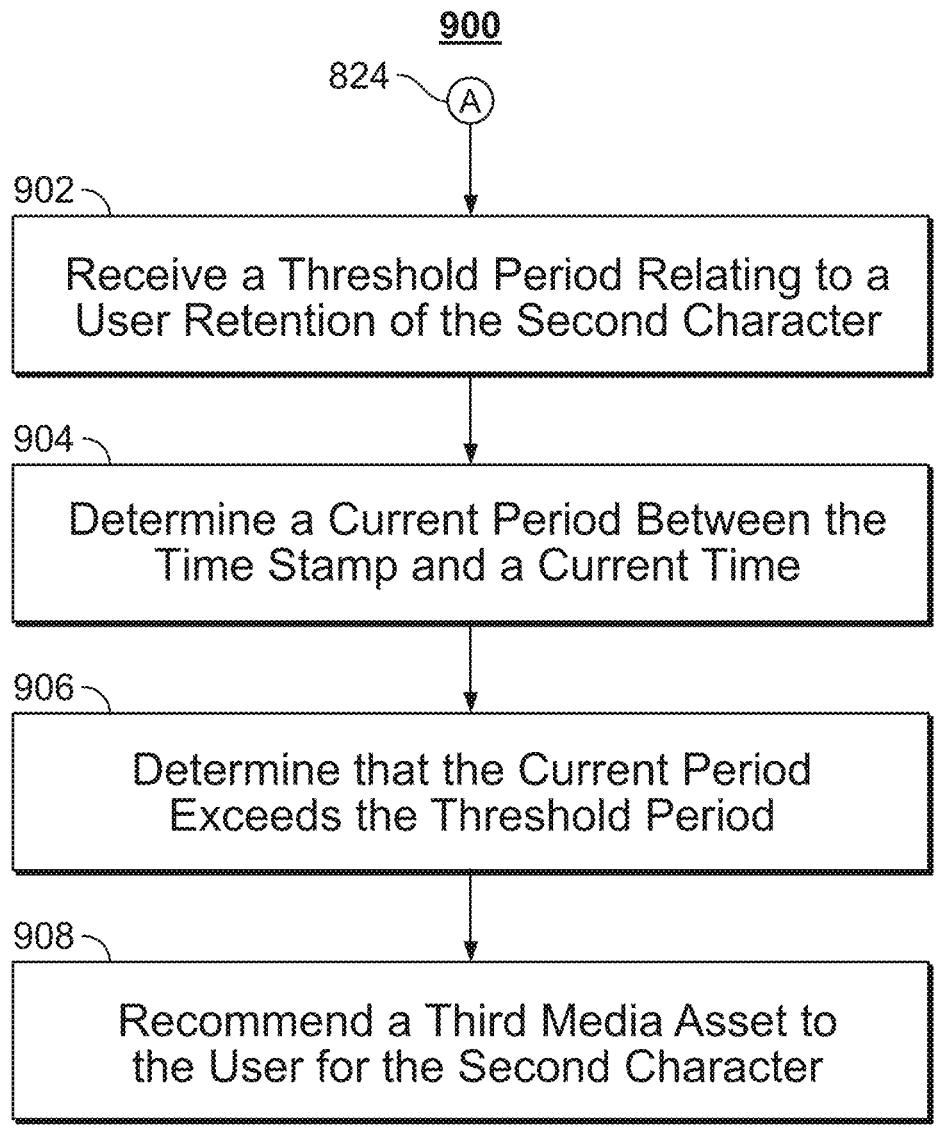
FIG. 9 depicts another illustrative flowchart of a process for recommending a third media asset relating to a second character, unknown to a user, in accordance with some embodiments of the disclosure.

FIG. 9 depicts another illustrative flowchart of a process for recommending a third media asset 204 relating to a second character 206, unknown to a user, in accordance with some embodiments of the disclosure. Process 900 may be executed by control circuitry 604 (e.g. in a manner instructed to control circuitry 604 by the media guidance application). Control circuitry 604 may be part of a remote server separated from the user by of communication network 714.

At 902, control circuitry 404 receives a threshold period relating to a user retention of the second character 206.

At 904, control circuitry 404 determines a current period between the time stamp and a current time.

At 906, control circuitry 404 determines that the current period exceeds the threshold period.

At 908, control circuitry 404 recommends a third media asset 204 to the user for the second character 206. Display 612 can be used to recommend the third media asset 204 to the user for the second character 206. Speakers 614 can be used to recommend a third media asset 204 to the user for the second character 206.

Figure 10:
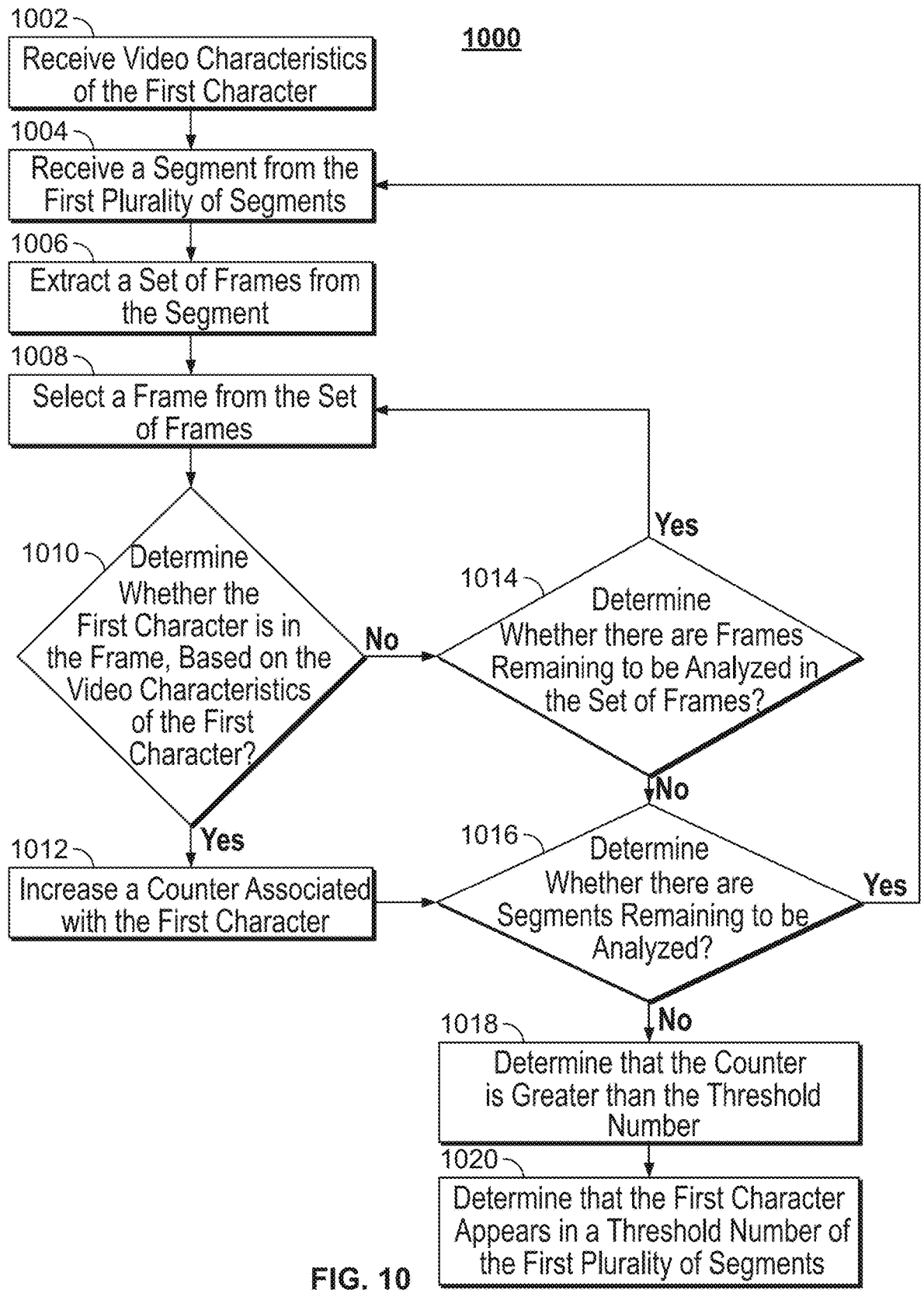
FIG. 10 depicts an illustrative flowchart of a process for determining that the first character appears in the threshold number of the first plurality of segments in accordance with some embodiments of the disclosure.

FIG. 10 depicts an illustrative flowchart of a process for determining that the first character 106 appears in the threshold number of the first plurality of segments in accordance with some embodiments of the disclosure. Process 1000 may be executed by control circuitry 604 (e.g., in a manner instructed to control circuitry 604 by the media guidance application). Control circuitry 604 may be part of a remote server separated from the user by of communication network 714.

At 1002, control circuitry 404 receives video characteristics of the first character 106.

At 1004, control circuitry 404 receives a segment from the first plurality of segments.

At 1006, control circuitry 404 extracts a set of frames from the segment.

At 1008, control circuitry 404 selects a frame from the set of frames.

At 1010, control circuitry 404 determines whether the first character 106 is in the frame based on the video characteristics of the first character 106.

If control circuitry 404 determines that the first character 106 is in the frame based on the video characteristics of the first character 106, process 1000 continues to 1012. At 1012, control circuitry 404 increases a counter associated with the first character 106.

If control circuitry 404 determines that the first character 106 is not in the frame based on the video characteristics of the first character 106, process 1000 continues to 1014. At 1014, control circuitry 404 determines whether there are frames remaining to be analyzed in the set of frames.

If control circuitry 404 determines that there are frames remaining to be analyzed in the set of frames, process 1000 continues to 1008.

If control circuitry 404 determines that there are no frames remaining to be analyzed in the set of frames, process 1000 continues to 1016. At 1016, control circuitry 404 determines whether there are segments remaining to be analyzed.

If control circuitry 404 determines that there are segments remaining to be analyzed, process 1000 continues to 1004.

If control circuitry 404 determines that there are no segments remaining to be analyzed, process 1000 continues to 1018. At 1018, control circuitry 404 determines that the counter is greater than the threshold number.

At 1020, control circuitry 404 determines that the first character 106 appears in a threshold number of the first plurality of segments.

Figure 11:
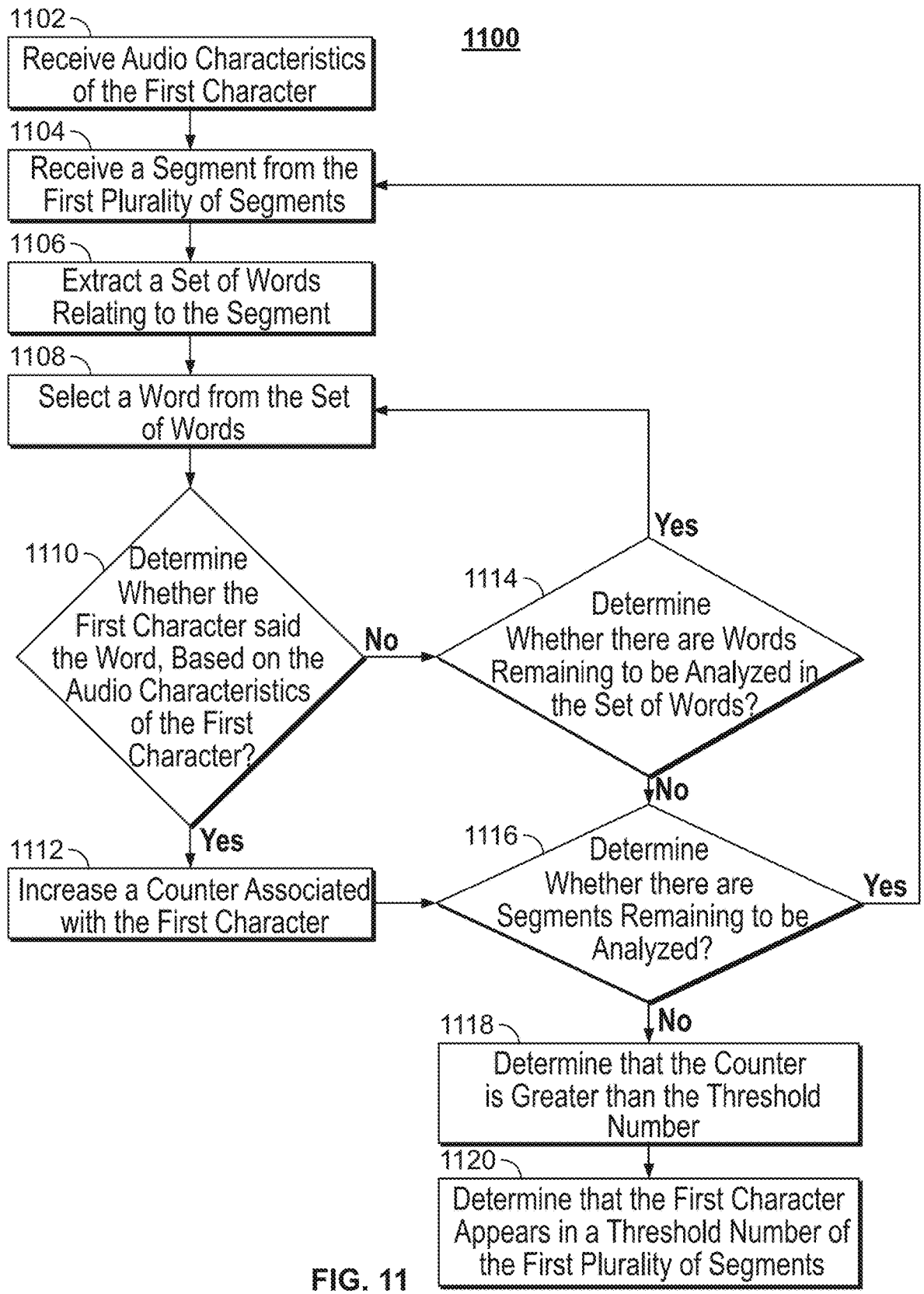
FIG. 11 depicts another illustrative flowchart of a process for determining that the first character appears in the threshold number of the first plurality of segments in accordance with some embodiments of the disclosure.

FIG. 11 depicts another illustrative flowchart of a process for determining that the first character 106 appears in the threshold number of the first plurality of segments in accordance with some embodiments of the disclosure. Process 1100 may be executed by control circuitry 604 (e.g., in a manner instructed to control circuitry 604 by the media guidance application). Control circuitry 604 may be part of a remote server separated from the user by of communication network 714.

At 1102, control circuitry 404 receives audio characteristics of the first character 106.

At 1104, control circuitry 404 receives a segment from the first plurality of segments.

At 1106, control circuitry 404 extracts a set of words relating to the segment.

At 1108, control circuitry 404 selects a word from the set of words.

At 1110, control circuitry 404 determines whether the first character 106 said the word based on the audio characteristics of the first character 106.

If control circuitry 404 determines that the first character 106 said the word based on the audio characteristics of the first character 106, process 1100 continues to 1112. At 1112, control circuitry 404 increases a counter associated with the first character 106.

If control circuitry 404 determines that the first character 106 did not say the word based on the audio characteristics of the first character 106, process 1100 continues to 1114. At 1114, control circuitry 404 determines whether there are words remaining to be analyzed in the set of words.

If control circuitry 404 determines that there are words remaining to be analyzed in the set of words, process 1100 continues to 1108.

If control circuitry 404 determines that there are no words remaining to be analyzed in the set of words, process 1100 continues to 1116. At 1116, control circuitry 404 determines whether there are segments remaining to be analyzed.

If control circuitry 404 determines that there are segments remaining to be analyzed, process 1100 continues to 1104.

If control circuitry 404 determines that there are no segments remaining to be analyzed, process 1100 continues to 1118. At 1118, control circuitry 404 determines that the counter is greater than the threshold number.

At 1120, control circuitry 404 determines that the first character 106 appears in a threshold number of the first plurality of segments.

Figure 12:
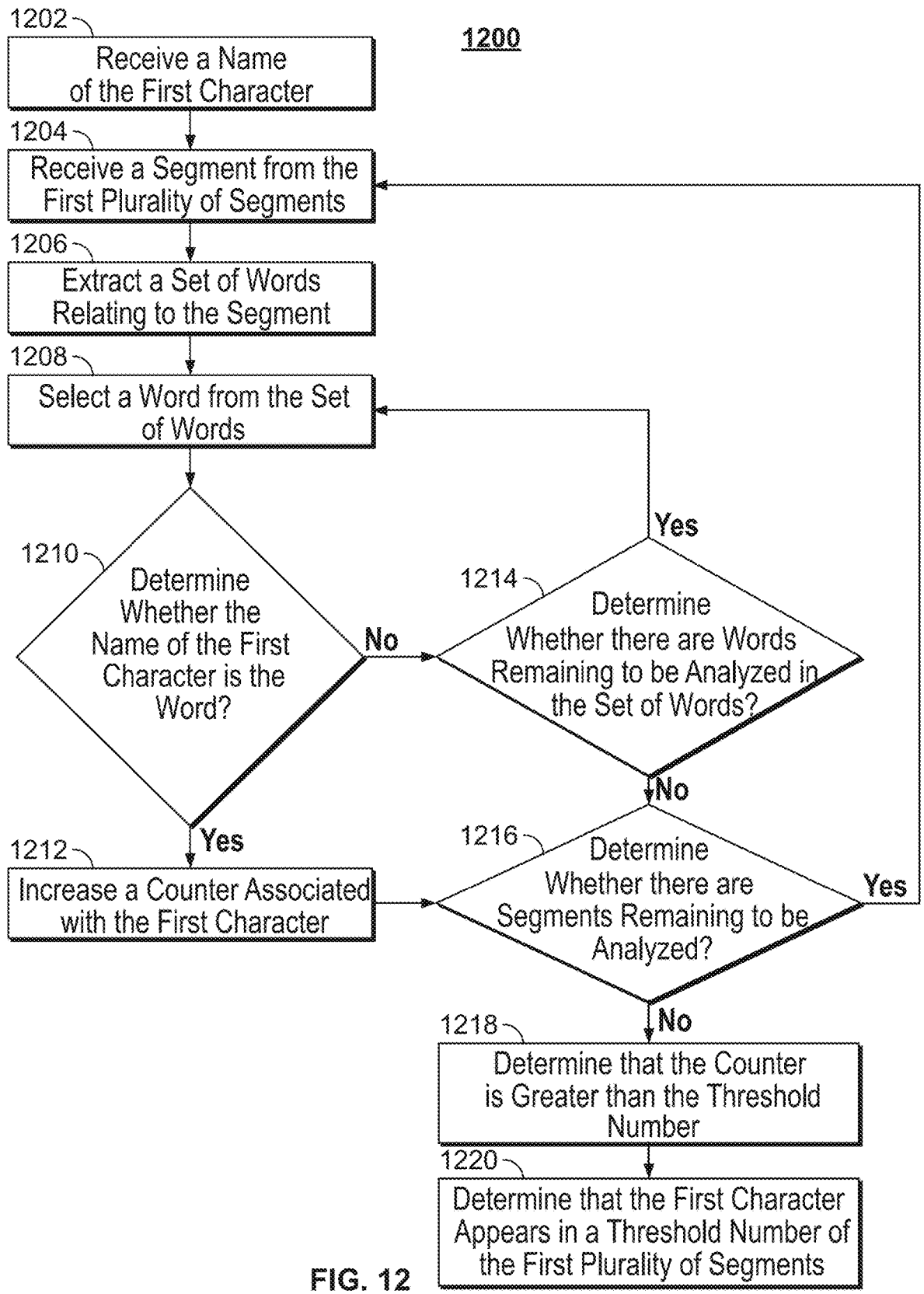
FIG. 12 depicts yet another illustrative flowchart of a process for determining that the first character appears in the threshold number of the first plurality of segments in accordance with some embodiments of the disclosure.

FIG. 12 depicts another illustrative flowchart of a process for determining that the first character 106 appears in the threshold number of the first plurality of segments in accordance with some embodiments of the disclosure. Process 1200 may be executed by control circuitry 604 (e.g., in a manner instructed to control circuitry 604 by the media guidance application). Control circuitry 604 may be part of a remote server separated from the user by of communication network 714.

At 1202, control circuitry 404 receives a name of the first character 106.

At 1204, control circuitry 404 receives a segment from the first plurality of segments.

At 1206, control circuitry 404 extracts a set of words relating to the segment.

At 1208, control circuitry 404 selects a word from the set of words.

At 1210, control circuitry 404 determines whether the name of the first character 106 is the word.

If control circuitry 404 determines that the name of the first character 106 is the word, process 1200 continues to 1212. At 1212, control circuitry 404 increases a counter associated with the first character 106.

If control circuitry 404 determines that the name of the first character'106 is not the word, process 1200 continues to 1214. At 1214, control circuitry 404 determines whether there are words remaining to be analyzed in the set of words.

If control circuitry 404 determines that there are words remaining to be analyzed in the set of words, process 1200 continues to 1208.

If control circuitry 404 determines that there are no words remaining to be analyzed in the set of words, process 1200 continues to 1216. At 1216, control circuitry 404 determines whether there are segments remaining to be analyzed.

If control circuitry 404 determines that there are segments remaining to be analyzed, process 1200 continues to 1104.

If control circuitry 404 determines that there are no segments remaining to be analyzed, process 1200 continues to 1218. At 1218, control circuitry 404 determines that the counter is greater than the threshold number.

At 1220, control circuitry 404 determines that the first character 106 appears in a threshold number of the first plurality of segments.

It is contemplated that the steps or descriptions of FIG. 8-12 may be used with any other embodiment of this disclosure. In addition, the descriptions described in relation to the algorithm of FIG. 8-12 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 8-12 may be implemented on a combination of appropriately configured software and hardware, and that any of the devices or equipment discussed in relation to FIGS. 6-7 could be used to implement one or more portions of the process.

It should be noted that processes 800-1200 or any step thereof could be performed on, or provided by, any of the devices shown in FIGS. 4-7. For example, any of processes 800-1200 may be executed by control circuitry 604 (FIG. 6) as instructed by control circuitry implemented on user equipment 702, 704, 706 (FIG. 7), and/or a user equipment for selecting a recommendation. In addition, one or more steps of processes 800-1200 may be incorporated into or combined with one or more steps of any other process or embodiment.

It is contemplated that the steps or descriptions of each of FIGS. 8-12 may be used with any other embodiment of this disclosure. In addition, the steps and descriptions described in relation to FIGS. 8-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-7 could be used to perform one or more of the steps in FIGS. 8-12.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 600, media content source 716, or media guidance data source 718. For example, a profile, as described herein, may be stored in, and retrieved from, storage 608 of FIG. 6, or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for recommending media assets relating to characters, the method comprising:
receiving, at a server, a first media asset comprising a plurality of media segments, each of the plurality of media segments comprising one or more video frames of the first media asset;
for each respective media segment of the plurality of media segments, determining, by the server, whether a character appears in the respective media segment;
calculating, by the server, a number of the plurality of media segments for which it was determined that the character appears in that media segment;
in response to determining, by the server, that the calculated number is greater than a threshold number of the plurality of segments, identifying, by the server, a second media asset associated with the first media asset; and
transmitting, to a user equipment device, a recommendation for the second media asset.

2. The method of claim 1, wherein identifying, by the server, the second media asset associated with the first media asset comprises identifying a media asset in which the character appears as the second media asset.

3. The method of claim 1, wherein identifying, by the server, the second media asset associated with the first media asset comprises:
receiving a media asset comprising a second plurality of media segments, each of the second plurality of media segments comprising one or more video frames of the media asset;
for each respective media segment of the second plurality of media segments, determining, by the server, whether the character appears in the respective media segment;
calculating, by the server, a number of the second plurality of media segments for which it was determined that the character appears in that media segment; and
in response to determining, by the server, that the calculated number is greater than a threshold number of the second plurality of segments, identifying, by the server, the media asset as the second media asset.

4. The method of claim 1, further comprising:
receiving a sensor input; and
determining that the user viewed the threshold number of the plurality of segments in which the character appears, based on the sensor input.

5. The method of claim 4, wherein recommending the second media asset to the user is further in response to determining that the user viewed the threshold number of the plurality of segments in which the character appears.

6. The method of claim 1, wherein determining that the calculated number is greater than the threshold number of the plurality of segments comprises:
receiving video characteristics of the character;
receiving a segment from the plurality of segments;
extracting the one or more video frames from the segment;
selecting a video frame from the extracted one or more video frames;
determining whether the character is in the video frame based on the video characteristics of the character;
in response to determining that the character is in the video frame, increasing a counter associated with the character;
determining whether there are segments remaining to be analyzed;
in response to determining that there are no segments remaining to be analyzed, determining that the counter is greater than the threshold number; and
in response to determining that the counter is greater than the threshold number, determining that the calculated number is greater than the threshold number of the plurality of segments.

7. The method of claim 1, wherein determining that the calculated number is greater than the threshold number of the plurality of segments, comprises:
receiving audio characteristics of the character;
receiving a segment from the plurality of segments;
extracting a set of words relating to the one or more video frames of the segment;
selecting a word from the set of words;
determining whether the character said the word, based on the audio characteristics of the character;
in response to determining that the character said the word, increasing a counter associated with the character;
determining whether there are segments remaining to be analyzed;
in response to determining that there are no segments remaining to be analyzed, determining that the counter is greater than the threshold number; and
in response to determining that the counter is greater than the threshold number, determining that the calculated number is greater than the threshold number of the plurality of segments.

8. The method of claim 1, wherein determining that the calculated number is greater than the threshold number of the plurality of segments, comprises:
receiving a name for the character;
receiving a segment from the plurality of segments;
extracting a set of words relating to the one or more video frames of the segment;
selecting a word from the set of words;
determining whether the name of the character is the word;
in response to determining that the name of the character is the word, increasing a counter associated with the character;
determining whether there are segments remaining to be analyzed;
in response to determining that there are no segments remaining to be analyzed, determining that the counter is greater than the threshold number; and
in response to determining that the counter is greater than the threshold number, determining that the calculated number is greater than the threshold number of the plurality of segments.

9. The method of claim 1, wherein the first media asset and the second media asset are in a same media series.

10. A system for recommending media assets relating to characters, the system comprising:
- a user equipment device having control circuitry configured to receive media asset recommendations; and
- a server having control circuitry configured to:
- receive a first media asset to be viewed by the user, the media asset comprising a plurality of media segments, each of the plurality of media segments comprising one or more video frames of the first media asset;
- for each respective media segment of the plurality of media segments, determine whether a character appears in the respective media segment;
- calculate a number of the plurality of media segments for which it was determined that the character appears in that media segment;
- in response to determining that the calculated number is greater than a threshold number of the plurality of segments, determine whether the character has a corresponding data structure in a character viewing profile;
- in response to determining that the character does not have the corresponding data structure in the character viewing profile, generate a recommendation of a second media asset in which the character appears; and
- transmit the recommendation to the user equipment device.

11. The system of claim 10, wherein the control circuitry is further configured, when identifying the second media asset associated with the first media asset, to identify a media asset in which the character appears as the second media asset.

12. The system of claim 10, wherein the control circuitry is further configured, when identifying the second media asset associated with the first media asset, to:
- receive a media asset comprising a second plurality of media segments, each of the second plurality of media segments comprising one or more video frames of the media asset;
- for each respective media segment of the second plurality of media segments, determine, whether the character appears in the respective media segment;
- calculate, a number of the second plurality of media segments for which it was determined that the character appears in that media segment; and
- in response to determining that the calculated number is greater than a threshold number of the second plurality of segments, identify the media asset as the second media asset.

13. The system of claim 10, wherein the control circuitry is further configured to:
- receive a sensor input; and
- determine that the user viewed the threshold number of the plurality of segments in which the character appears, based on the sensor input.

14. The system of claim 13, wherein the control circuitry configured to recommend the second media asset is further configured to recommend the second media asset in response to determining that the user viewed the threshold number of the plurality of segment in which the character appears.

15. The system of claim 10, wherein the control circuitry is further configured, when determining that the calculated number is greater than the threshold number of the plurality of segments, to:
- receive video characteristics of the character;
- receive a segment from the plurality of segments;
- extract the one or more video frames from the segment;
- select a video frame from the extracted one or more video frames;
- determine whether the character is in the video frame based on the video characteristics of the character;
- in response to determining that the character is in the video frame, increase a counter associated with the character;
- determine whether there are segments remaining to be analyzed;
- in response to determining that there are no segments remaining to be analyzed, determine that the counter is greater than the threshold number; and
- in response to determining that the counter is greater than the threshold number, determine that the calculated number is greater than the threshold number of the plurality of segments.

16. The system of claim 10, wherein the control circuitry is further configured, when determining that the calculated number is greater than the threshold number of the plurality of segments, to:
- receive audio characteristics of the character;
- receive a segment from the plurality of segments;
- extract a set of words relating to the one or more video frames of the segment;
- select a word from the set of words;
- determine whether the character said the word, based on the audio characteristics of the character;
- in response to determining that the character said the word, increase a counter associated with the character;
- determine whether there are segments remaining to be analyzed;
- in response to determining that there are no segments remaining to be analyzed, determine that the counter is greater than the threshold number; and
- in response to determining that the counter is greater than the threshold number, determine that the calculated number is greater than threshold number of the plurality of segments.

17. The system of claim 10, wherein the control circuitry is further configured, when determining that the calculated number is greater than the threshold number of the plurality of segments, to:
- receive a name for the character;
- receive a segment from the plurality of segments;
- extract a set of words relating to the one or more video frames of the segment;
- select a word from the set of words;
- determine whether the name of the character is the word;
- in response to determining that the name of the character is the word, increase a counter associated with the character;
- determine whether there are segments remaining to be analyzed;
- in response to determining that there are no segments remaining to be analyzed, determine that the counter is greater than the threshold number; and
- in response to determining that the counter is greater than the threshold number, determine that the calculated number is greater than threshold number of the plurality of segments.

18. The system of claim 10, wherein the first media asset and the second media asset are in a same media series.

* * * * *